Figure 4:
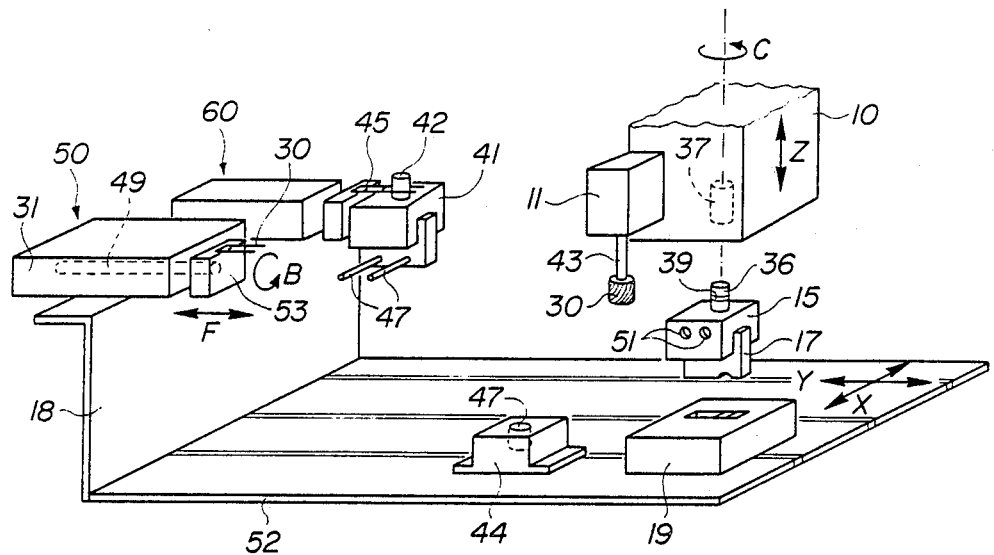

United States Patent [19]

Briffod

[11] Patent Number: 4,891,485
[45] Date of Patent: Jan. 2, 1990

[54] DEVICE FOR FASTENING AN EDM TOOL IN PLURAL ORIENTATIONS

[75] Inventor: Jean-Paul Briffod, Lucinges, France

[73] Assignee: Charmilles Technologies S.A., Meyrin, Switzerland

[21] Appl. No.: 203,019

[22] Filed: Jun. 6, 1988

[30] Foreign Application Priority Data

Jun. 10, 1987 [CH] Switzerland ............... 2189/87
Oct. 12, 1987 [CH] Switzerland ............... 3979/87

[51] Int. Cl.$^4$ ............................................. B23D 1/08
[52] U.S. Cl. .................... 219/69.15; 219/69.17; 219/69.1
[58] Field of Search ............... 219/69 R, 69 G, 69 E, 219/69 M

[56] References Cited

U.S. PATENT DOCUMENTS

| | | | |
|---|---|---|---|
| 3,806,691 | 4/1974 | Roach | 219/69 E |
| 4,307,279 | 12/1981 | Inoue et al. | 219/69 M |
| 4,596,066 | 6/1986 | Inoue | 219/69 M |

FOREIGN PATENT DOCUMENTS

| | | | |
|---|---|---|---|
| 0111633 | 6/1984 | European Pat. Off. | 219/69 E |
| 0241165 | 10/1987 | European Pat. Off. | 219/69 E |
| 2854035 | 7/1980 | Fed. Rep. of Germany | 219/69 E |
| 2915265 | 10/1980 | Fed. Rep. of Germany | 219/69 E |

Primary Examiner—M. H. Paschall
Attorney, Agent, or Firm—Gifford, Groh, Sheridan, Sprinkle and Dolgorukov

[57] ABSTRACT

A device permits fastening a tool (preferably an EDM tool) to a machining head in at least two different orientations. The tool is mounted on a tool holder, and a pair of portions alternately fix the holder to the head in two different orientations, for example, one in which the tool is positioned for machining operations, and another in which it is positioned for touching up. In a first embodiment the portions are formed as two studs provided on the holder each engageable with the machining head. The studs are positioned with respect to the tool so that engagement with the machining head presents the tool in the two different orientations. In a second embodiment one of the portions is formed on a first tool holder which carries the tool thereon, while the other portion is formed on a second holder mountable to the machining head, the first holder being being mountable either to the machining head directly or to the second holder.

21 Claims, 3 Drawing Sheets

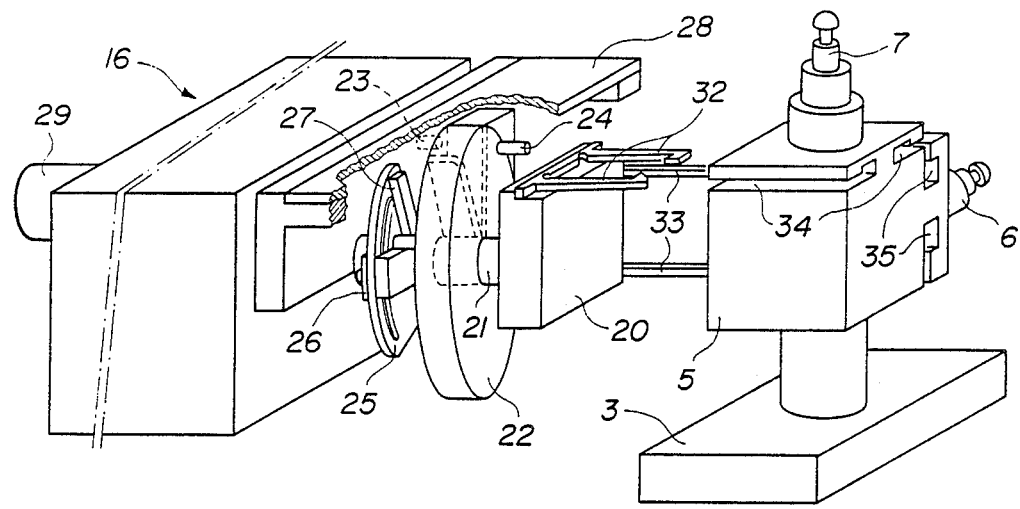
FIG. 1
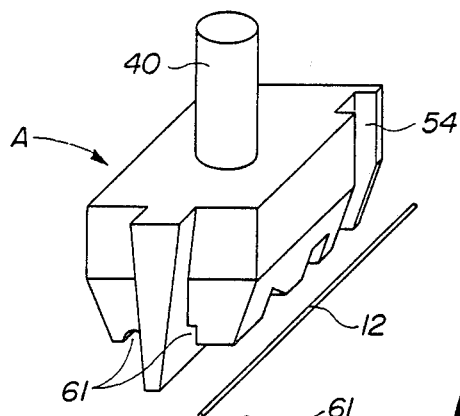
FIG. 2
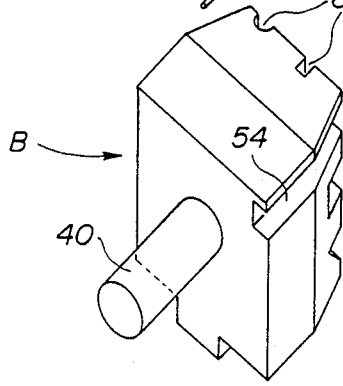

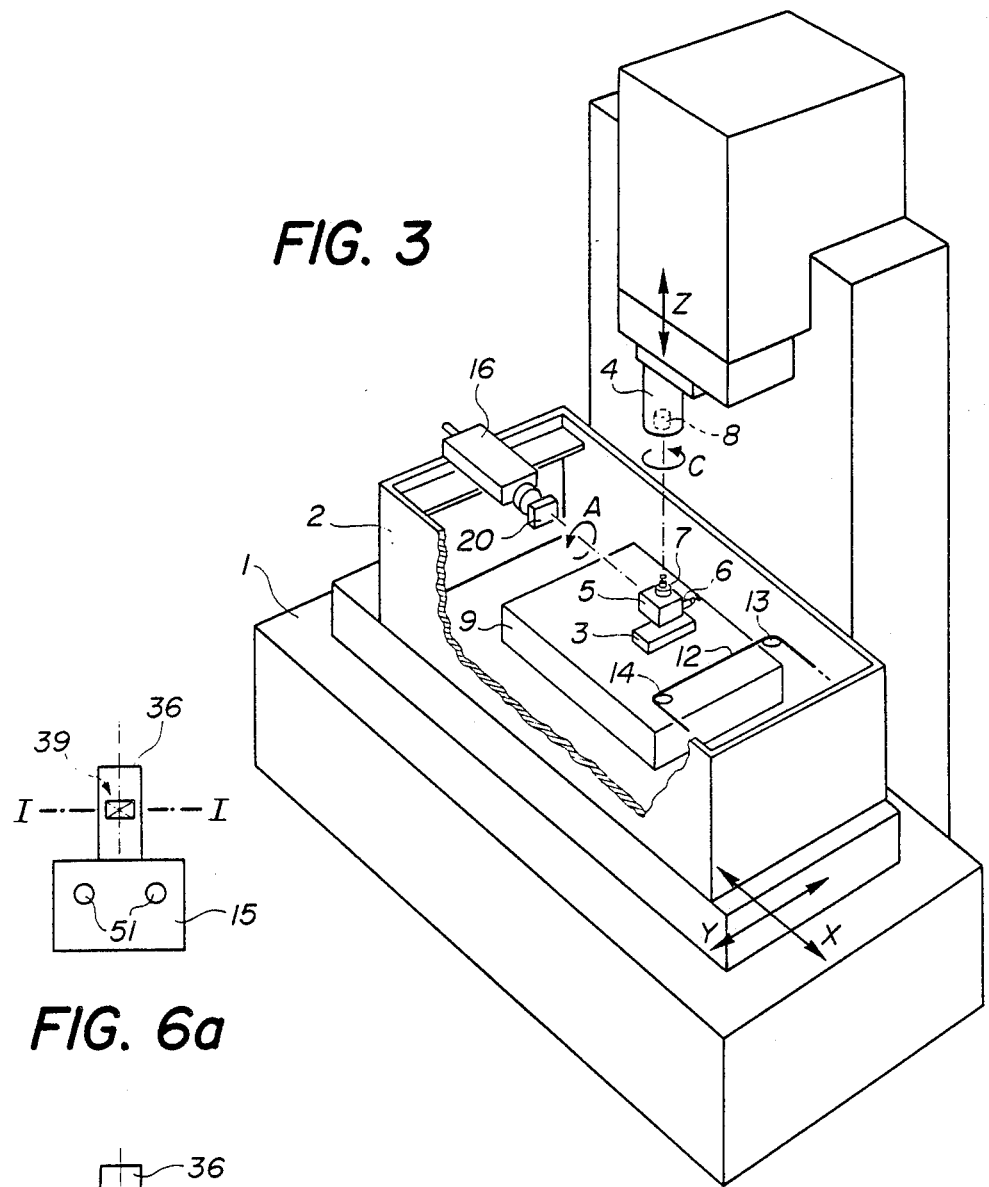
FIG. 3
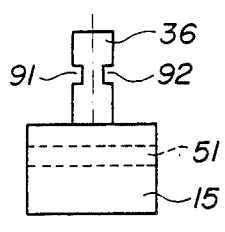
FIG. 6a
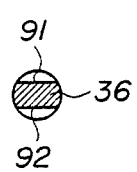
FIG. 6b
FIG. 6c
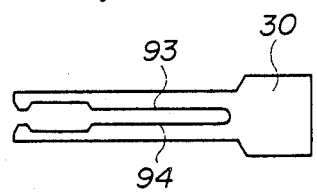
FIG. 6d

DEVICE FOR FASTENING AN EDM TOOL IN PLURAL ORIENTATIONS

The invention concerns a device comprising a tool-holder and a grasping (or catch) component enabling a tool to be fixed in the working position on a machining head and then oriented in a second direction, corresponding, for example, to a position for manufacture or touching up of this tool. It also concerns the use of such a device on a machine for electrical discharge machining.

In electrical discharge machining (EDM), it is advantageous to be able to true (or touch up) or even manufacture an electrode-tool for die-sinking on the EDM machine itself, therefore without having to remove it from its tool-holder and mount it on a precision grinding machine—this is simpler and therefore quicker and allows higher precision and automation. Moreover, by using a single machine, space is saved and above all there are substantial cost savings because this touching up or manufacture is then carried out by means of an auxiliary tool operated by the high precision mechanisms and control units already provided on the die-sinking machine. The auxiliary tool may be a mechanical tool or a tool for electrical discharge machining such as an electrode-wire.

Such a device is already known in the prior art which allows use of the same numerical control system and in particular the same high precision mechanical assembly for moving either the part to be machined or the wire used for touching up with respect to the die-sinking tool. It is described in the Japanese patent application published under the number 57-194828 according to which the wire guides and the wire feed components are fixed to the machining tank; they therefore move integrally with the part to be machined, the wire guides remaining fixed with respect to the tank. An arrangement of this kind only allows the electrode-wire to cut out the die-sinking tool in a plane parallel to the X and Y axes of the device for moving the tank (and the part to be machined and the cutting wire) relative to the tool. Note that although the die-sinking tool may move in the direction of its axis it retains the same orientation (perpendicular to the working plane XY) whether it is in position for die-sinking or being touched up.

This is also the case for the device described in the Japanese patent applications published under the numbers 61-159330, 61-159331, 61-159332 and 61-159333. However, thanks to a wire guide that can be moved in a direction perpendicular to the working plane XY, it is possible to incline the electrode-wire so as to cut the end of the die-sinking tool in a plane that is not necessarily parallel to the XY plane.

Similarly, the device described in the European patent application published under the number 217 188 also enables the electrode-wire to be inclined so as to cut the die-sinking tool in a plane which is not parallel to the plane XY. The die-sinking tool is mounted so as to be able to move in the direction of its axis and to rotate about it, but always retains the same orientation (perpendicular to the XY plane) whether it is in the working position or the touching-up position.

Another device is known that enables the two kinds of tools (die-sinking electrode and electrode-wire) to be moved with respect to the part to be machined or to move either the electrode-wire or the part to be machined relative to the die-sinking tool. This device, described in Swiss Pat. No. 659 605 therefore enables the part to be also machined by cutting using electrical discharge machining. The wire guides are mounted on the machine frame. A mechanism, such as a table with cross-slide motion, allows movement, with respect to X and Y axes defining the "working plane", of the part to be machined relative either to the electrode-wire or to the die-sinking tool, the latter being in the operating position. It also allows the die-sinking tool to be moved relative to the electrode-wire when this tool is in the position for touching up. The die-sinking tool is mounted on a tool-holder allowing the tool to be fixed in two distinct positions, either with respect to the machining tank (position for touching up or manufacture) or with respect to the machine frame (position for die-sinking) and also allows it to rotate about its axis B1. The tool-holder can also move in a direction orthogonal to the X and Y axes. Note that this axis B1, and therefore the orientation of the tool, remains parallel to the XY plane whatever the position of the tool. The support for the wire guides can tilt about an axis orthogonal to the tool axis and parallel to the XY plane. This makes it possible to incline the wire with respect to the path to be cut out in the workpiece or to the axis of the tool to be touched up. It should be added that the workpiece is mounted on the tank so as to be able to rotate about an axis parallel to the axis of the die-sinking tool. All the translation and rotation movements necessitated by these different types of machining are performed using only one high precision mechanism and only one appropriately programmed numerical control system. However, this arrangement is complicated and therefore costly. Moreover, it cannot be made in the form of an accessory that can be retro-fitted to a conventional electrical discharge machining machine. It should be noted that in this case too the die-sinking tool always remains parallel to the same direction.

The object of the present invention is an arrangement allowing machining on a die-sinking machine of a die-sinking tool of a form more complex than is possible with the means described in the patent application JP-57/194828 but not requiring a mechanism as complicated and costly as that described in the patent CH 659 605 and that can be added to a conventional die-sinking EDM machine, that is to say one provided with components to allow relative motion of the work table and the tool with respect to three perpendicular axes X, Y and Z as well as rotation of the tool abouts its axis. This machining of the tool (manufacture or touching up) must, in addition, be carried out without manual intervention and without having to remove the tool (generally made of a relatively fragile material such as graphite) from its tool-holder during machining which could modify the reference positions of the tool with respect to the part to be machined. Finally, it should allow relative displacements between the tool to be touched up and the auxiliary tool that are more complex than those of conventional die-sinking machines. This arrangement evidently comprises an auxiliary tool, for example an electrode-wire, with known types of components for suppy, mechanical tensioning and removal as well as the device that is the subject of this invention.

The object of this invention is a device as specified in claim 1 which enables a tool held in a tool-holder to be oriented first for being machined (manufacture or touching up) and then for use in die-sinking.

Another object of this invention is the use of the above device on an EDM die-sinking machine, such as specified in claim 14.

Unlike the known devices cited above, this invention no longer requires the wire to be inclined with respect to the XY plane. The wire guides are fixed with respect to this plane, the direction of the wire between these guides remaining, for example, alway parallel to the XY plane. This allows simplification of the components for feeding the electrode-wire through the machine.

A further advantage of the invention is that it does not require the addition of a high precision mechanism to carry out translations and rotations but only a tool-holder or a component fitted with appropriate fixing means capable of reproducibly fixing a tool in several distinct orientations. It is not necessary for the angles between these orientations to be predetermined with high precision, it suffices to calibrate the electronic control system so as to take into account any deviation with respect to the set value for this angle. The perfect reproducibility of these angles by locking the fixing means in several positions is easy to obtain. Changing from one orientation to another may be achieved, for example, by low precision linear and rotary hydraulic and/or pneumatic actuators that can be stopped in a number of distinct positions. Such actuators are commercially available at moderate cost.

Finally, if the invention is realized in practice by the addition of auxiliary devices to an existing machine, the machining accuracy of the machine will be retained.

The auxiliary electrode-wire can also be used for cutting out the part to be machined, for example before finishing by die-sinking machining, as described in Swiss Pat. No. 659 605 cited above.

In a variant of this invention, machining of the electrode-tool can also be carried out using instead of a wire-electrode a die-sinking electrode or a tool for mechanical machining, for example a milling cutter, mounted on the machining head of the machine. Such an arrangement again allows the same numerical control system and the same high precision mechanical system to be used to move either the part to be machined or the milling cutter (or other type of auxiliary tool) with respect to the die-sinking tool.

In the following description the invention is explained in more detail with the help of drawings representing only two of the numerous possible ways of realizing this invention.

Figure 5:
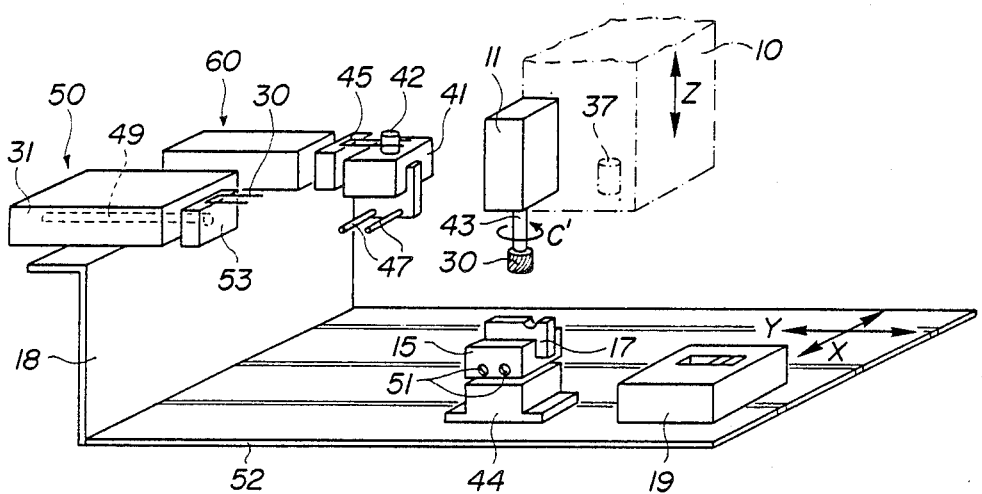

FIG. 1 is a detailed view of a first example of realization of a tool-holder and grasping component according to this invention, arranged to allow orientation of a tool in one of two directions at an angle of 90° to each other; FIG. 2 shows the two different relative positions between the die-sinking tool and the wire-electrode used for machining it obtained with the device of FIG. 1; FIG. 3 is an overall view of a die-sinking EDM machine on which is mounted the device of FIG. 1; FIG. 4 is a representation of a second realization of the invention which this time allows the tool to be oriented in two directions at an angle of 180° to each other; FIG. 5 shows the same realization as that of FIG. 4 where the tool is in position for touching up; FIG. 6 shows the details of one of the grasping components used in the realization shown in FIGS. 4 and 5.

FIG. 1 shows a tool-holder 5 in a position where it can be gripped by the grasping component 16. This tool-holder 5 has two studs 6 and 7 which are similar but oriented at 90° to each other. These studs are shaped so as to be able to engage in a hole in the machining head 4 and be locked there in a predetermined position with precision. The tool-holder is evidently held by the machining head by means of the stud 7 but for greater clarity the machining head is not shown in this figures. The component 16 comprises a part 20 carried by a shaft 21 actuated by a rotary hydraulic or pneumatic actuator 22, capable of rotating the part 20 through an angle equal to that formed by the two studs 6 and 7. The rotation of the actuator 22 is obtained by supplying a fluid under pressure to one of the nipples 23 and 24. A segment 25 with an adjustable stop 26 and a positioning arm 27 limits the angle of rotation and determines the extreme positions of the actuator 22. This actuator is carried by a support plate 28 that can be moved parallel to the axis of the shaft 21 by a linear actuator 29. The part 20 is provided with two pairs of spring hooks 32 and 33 designed to engage in two corresponding pairs of grooves 34 and 35 provided in the tool-holder 5. A displacement towards the right of the part 20 by the linear actuator 29 engages the hooks 32 and 33 in the grooves 34 and 35 of the tool-holder 5 and holds it after the machining head has released it and moved away. A quarter turn of the rotary actuator 22 then brings the tool-holder 5 into its new orientation so that the stud 6 is oriented in the same way as the stud 7 was previously and therefore in the same direction as the hole in the machining head. The machining head is then brought up to the tool-holder 5 until the stud 6 engages in this hole and is locked. Finally, the linear actuator 29 is operated so as to retract the part 20 to the left, causing the hooks 32 and 33 to slide out of the grooves 34 and 35 of the tool-holder 5.

It should be noted that the linear actuator 29 is not essential since the relative movement of the component 20 and the tool-holder 5 may also be achieved by moving the machining head. The precision of the movements of the grasping component 16 may be low without this compromising the positioning of the tool-holder 5 on the machining head, provided that the studs 6 and 7 are designed to engage in the hole in the machining head even if they are not perfectly lined up with it and that their locked position in this hole is independent of their initial alignment, this being easy to achieve.

FIG. 2 shows a die-sinking tool oriented in two different directions with respect to the wire-electrode 12. This tool has a rod 40 intended to be fixed in the tool-holder (not shown in FIG. 2). To clarify the description, assume that in the die-sinking position the tool is oriented as in A. Evidently, it can also be oriented as in A during its manufacture or precision finishing. It can be seen that this change of orientation makes it possible to use the wire 12 for machining both the groove 54 and the grooves 61 which would be impossible using only the four degrees of freedom X, Y, Z and C of the machining head with respect to the wire. The component 16 is clearly not very expensive and above all it may be retro-fitted without great expense on existing machines.

FIG. 3 is a highly schematic representation of a die-sinking EDM machine using the device according to the invention. The reference FIG. 1 indicates the frame of the machine and 2 the tank in which is fixed (by means not shown) the part to be machined 9. The tank can be moved horizontally in two perpendicular directions X and Y, while movement in the Z direction, orthogonal to the axes X and Y and necessary for machining the part 9 by means of an electrode-tool 3 is obtained by a moving machining head 4. A tool-holder 5 is fixed to this head 4 and holds the tool 3. In addition to its vertical motion Z, the machining head 4 (and therefore the tool 3) can rotate about an axis parallel to Z as indicated by the arrow C. FIG. 3 shows the tool 3 engaged in the tool-holder 5 but to make the drawing clearer assembly of these two parts is shown separated from the head 4. There are two kinds of machining operations: either the tool 3 machines the workpiece 9 by electrical discharge machining or the tool itself is machined by means of the wire-electrode 12 stretched horizontally between two guides 13 and 14 essentially fixed with respect to the tank 2. The wire 12 runs between these guides 13 and 14 so as to be constantly renewed. The mechanical means to carry out this renewal and the circuits for generating the electrical pulses either between the workpiece 9 and the die-sinking tool 3 or between the die-sinking tool and the wire-electrode 12 are well known in the art and are therefore neither shown in the drawing nor described below.

The machining of the tool 3, its manufacture and, if appropriate, its touching up, can be achieved by using the mechanisms and control circuits of the machine which allow the translation movements in the X, Y and Z directions and the rotary motion C together with the pulse generator of the machine and the device described in FIG. 1 which enables the tool-holder 5 to be coupled to the machining head 4 in two different orientations. Engagement of the stud 6 in the hole 8 will orientate the tool in a direction obtained from that shown in the figure by rotation by 90° about the X axis. This new orientation considerably enlarges the scope for machining and in particular the scope for fabrication and touching up of the tool 3 by the wire-electrode 12.

The grasping component 16 is mounted in or on the tank 2 at a point such that the relative movements of the tank 2 and the machining head 4 enable the tool-holder 5 to be brought into immediate proximity with this element. The numerical control system (not shown) of the machine then causes the element 16 and the tool-holder 5 to be brought together so that the hooks of the former engage in the grooves of the latter and then controls the release of the stud 7 engaged in the hole 8 and the partial retraction of the head 4, the rotation by a quarter turn (arrow A) of the part 20, followed by the movement of the head 4 towards the tool-holder 5 until the stud 6 is in line with the hole 8 and locking of this stud and, finally, movement of the head 4 away from the element 16 to a predetermined touching up position facing the wire-electrode 12. The tool 3 has tilted by 90° about an axis parallel to the X axis, that is to say normal to the wire electrode 12. The control system then controls the EDM cutting of the tool 3 by the wire 12 using known techniques. It then controls, in a way similar to that described above, the reorientation of the tool into the die-sinking position, which is terminated by the locking of the stud 7 in the hole 8 and the movement of the head 4 away from the element 16 to its starting position (the precise references of which are stored by the numerical control system) when machining of the tool is carried out during die-sinking. The machine is then ready to resume machining with the tool that has been touched up.

FIG. 4 is a representation of certain elements of an EDM machine using a second mode of realization of the device according to the invention in which the auxiliary tool is no longer a wire-electrode but a milling cutter and shows a machining head 10, a machine table 52 for supporting the workpiece 19 and an electrode-holder 15 carrying the electrode-tool 17. For die sinking, the tool-holder 15 is coupled to the head 10 by engagement and locking of a fixing cylinder 36 in an accomodating hole or chuck 37. The elements 36 and 37 represent, without details such as the means for locking and for preventing rotation, the male and female parts of known electrode fixing devices such as, for example, that described in European patent application No. 111 092. For ease of reference, the elements 36 and 37 will be designated "cylinder" and "chuck" in the following text. In practice, the table 52 will be fixed inside a tank which is not shown. To obtain the movements necessary for machining the workpiece 19 by the tool 17, the table 52 is carried by an assembly (not shown) of carriages and slides allowing it to move in the directions of the double-headed arrows X and Y and the head 10 can be moved vertically in the direction of the double-headed arrow Z by a suitable mechanism (also not shown in the drawing). The relative movements of the head 10 and the table 52 are described below as though the table were fixed and the head moved in the X and Y directions. Finally, a movement indicated by the arrow C allows the machining head 10 to rotate about a vertical axis. A milling cutter 11 is mounted on the head 10 and carries a mill 30 mounted on a spindle 43. In addition to the rotation, the mill 30 can also be moved with high precision in the directions of the three axes X, Y and Z by the movements of the head 10. A support 44 mounted on the table 52 is provided with a chuck 47 similar to the chuck 37 and therefore is also able to accomodate and clamp the cylinder 36 to hold the tool 17 so that the face to be touched up is on top. This face can then be machined with the required precision by the mill 30, using the X, Y and Z movements for which the elements (mechanisms and controls) already exist on the EDM machine.

The automatic transfer of the tool-holder 15 from the head 10 to the support 44 and rotation of the tool-holder by 180° to cause the cylinder 36 to point up or down are carried out by means of the grasping components 50 and 60 mounted on a wall 18 integral with the table 52. The device 50 comprises a box 31 in which is engaged a shaft 49 (indicated by dashed lines in the drawing) parallel to the table 52 and which carries at one end a support 53 on which is mounted a fork 30. The box 31 also contains the components necessary for actuating the shaft 49 and the support 53 in the direction of the double-headed arrow F and for rotating it as indicated by the arrow B. The device 60 comprises a part 41 which has a cylinder 42 similar to the cylinder 36, a fork 45 similar to the fork 30 and two rods 47 of diameter and spacing such that they can be easily engaged in the two corresponding holes 51 provided for this purpose in the tool-holder 15. In the operating position, the cylinder 36 is engaged and locked in the chuck 37. If the tool needs touching up, the numerical control system (not shown) causes:

machining to be stopped, and then a movement of the head towards the device 50 so that a groove 39—shown in more detail in FIG. 6—in the cylinder 36 is positioned opposite the fork 30, then a movement of the support 53 towards the right of the drawing so that the fork 30 engages in the groove 39 unclamping of the chuck 37 which releases the cylinder 36 a movement of the head 10 upwards sufficiently to withdraw it from the cylinder 36 a rotation by 180° about a horizontal axis of the support 53 coupled to the tool-holder 15. This gives the tool-holder the required orientation for coupling to the stand 44. Then the head 10 moves to the component 60 until it is over the part 41, the chuck 37 being lined up with the cylinder 42, then it moves down until the cylinder 42 is engaged and locked in the chuck 37 and moves towards the right of the drawing to remove the part 41 from the fork 45. However, if the fork 45 forms part of a component 60 similar to the component 50, the movement of the head 10 to the right may be replaced by a withdrawal of the fork 45 to the left. The control system then causes the movement of the head 10 towards the device 50 until the rods 47 engage in the holes 51 of the tool-holder 15 which is still held in the inverted position by the fork 30, then either withdrawal of the fork 30 to the left in the drawing or movement of the head 10 to the right which frees the tool-holder 15, a movement of the head 10 to the stand 44 so that the cylinder 36 is aligned with the chuck 47, a downwards movement of the head 10 to engage and lock this cylinder in this chuck retraction of the head 10 so as to disengage the rods 47 and then, if necessary, a movement of the head 10 to the device 60 to again engage the part 41 on the fork 45 followed by release and disengagement of the cylinder 52 from the chuck 37 and a final movement of the head 10 away from the device 60. Thus, the configuration shown in FIG. 5 is obtained where the tool 17 is held fixed with the face to be touched up uppermost and ready for machining either by the mill 30 or by a secondary electrode-tool (not shown in the drawing) fixed to the head 10 and which the head 10 can fetch by known techniques from a suitable magazine. The transfer back again and turning right-side up of the tool-holder 17 is carried out by reversing the above sequence of operations.

It should be noted that in general the turning over of the tool-holder by the component 50 can be carried out either when the tool-holder 15 is carried by it directly (as described above) or when the tool-holder is engaged on the part 41 which is itself held by the component 50. When using the latter method, the tool-holder 15 must be prevented from detaching itself from the part 41 while being turned over, but this method may nevertheless be useful in certain cases. Although only the complete inversion of the tool-holder, that is to say a change of orientation by 180°, is described here, it is evident that other values of this angle may be used.

FIG. 6a to 6d show in greater detail how the fork 30 takes hold of the cylinder 36 by engaging in the groove 39. To prevent rotation of the cylinder, this groove 39 consists of two flats 91 and 92 as shown in FIGS. 6a to 6c. All the other elements of these figures are given the same number as in previous figures and, for simplicity, the tool-holder 15 is shown without the electrode-tool 17 and also without the system for fixing these two elements together. FIG. 6c shows a section I—I of the cylinder 36 with the flats 91 and 92, corresponding to the flat surfaces 93 and 94 of the fork 30, which allow the fork to engage in the special groove 39.

Finally, it can be seen in this second example that the transfer and change of orientation of the tool-holder are also carried out uniquely by movements of the mahcining head for which the mechanisms and numerical control systems already exist on any die-sinking machine, supplemented by the movements of grasping components. The latter are simple, may, for example, be actuated pneumatically and low precision is sufficient. This allows flexibility in the construction of these devices which need not be expensive and can be easily installed on conventional EDM machines.

I claim:

1. A device for automatically fixing a tool on a machining head alternately in either a working position or in a second position oriented differently from said working position, comprising:

a tool holder to which said tool is mounted;

first means for detachably securing said holder to said machining head so as to orient said tool in said working position;

second means for detachably securing said holder to said machining head so as to orient said tool in said second position; and means for grasping said holder and moving said holder between securement to said machining head by one of said first and second securing means and securement by the other of said second and first securing means.

2. The device according to claim 1, wherein said grasping means is adapted to rotate said holder about an axis through a predetermined angle between securement by said first and second securing means.

3. The device according to claim 1, wherein at least one of said first and second securing means comprises a coupling component on said holder, and said device further comprises a complementary element on said machining head and means locking said component to said element.

4. The device according to claim 1, wherein said grasping means comprises at least one fork adapted to hold said holder.

5. The device according to claim 4, wherein said holder includes grooves dimensioned to receive said at least one fork of said grasping component means.

6. The device according to claim 1, further comprising hydraulically or pneumatically operated actuators for controlling rotation of said holder by said grasping means.

7. The device according to claim 2, wherein said grasping means is adapted to translate said holder in the direction of said axis.

8. The device according to claim 1, wherein said tool defines a tool axis and said machining head defines a machining head axis, and said second securing means positions said holder so that said tool axis lies at a predetermined angle with respect to said machining head axis.

9. The device according to claim 1, wherein one of said first and second securing means comprises a carrying part including means for gripping said tool holder during movement and means for fixing said tool holder to said machining head; and wherein said grasping means comprises a first grasping component adapted to hold said tool holder and rotate it between 90° and 180°, and a second grasping component having means for detachably gripping said carrying part.

10. The device according to claim 3, wherein a plurality of coupling components are located on said holder at different angles corresponding to different intended orientations of said tool.

11. The device according to claim 10, wherein said plurality of coupling components comprises two studs disposed at a right angle to each other.

12. The device according to claim 9, wherein said machining head includes a chuck, wherein one of said first and second securing means comprises a cylinder on said holder dimensioned to be received in said chuck, wherein said grasping means comprises a fork, and wherein said cylinder is provided with a groove for engaging said fork.

13. The device according to claim 12, wherein said carrying part comprises rods and said fixing means of said holder comprises holes arranged to receive said rods therein.

14. The device according to claim 9, wherein said means for fixing said carrying part to said machining head is identical to said means for fixing said holder to said machining head.

15. In combination, an EDM machine incorporating the device according to claim 1.

16. The device according to claim 15, wherein said EDM machine includes an auxiliary machining tool.

17. The device according to claim 16, wherein said EDM machine includes a machining tank moveable horizontally in two crossed directions, wherein said machining head is adapted to move vertically and to rotate about an axis, and wherein said auxiliary machining tool is a wire electrode running between two guides fixed either on a rim of said machining tank or to a frame integral with a table connected to said tank, said table being moveable in said two crossed directions.

18. The device according to claim 16, wherein said EDM machine includes a machining tank moveable horizontally in two crossed directions, wherein said machining head is adapted to move vertically and to rotate about an axis, and wherein said auxiliary tool is a milling attachment affixed to said machining head.

19. The device according to claim 18, wherein said tank is connected to a table moveable in said two crossed directions and said device further comprises a support fixed to said table which is adapted to hold said holder during milling of said tool by said milling attachment.

20. A method of affixing a tool to a machining head alternately in either a working position or in a second position oriented differently from said working position, comprising the steps of:

affixing said tool to a tool holder;

associating said holder with first means for detachably securing said holder to said machining head so as to orient said tool in said working position, and with second means for detachably securing said holder to said machining head so as to orient said tool in said second position;

coupling said holder to a grasping means while said holder is secured by said first securing means;

separating said holder from said machining head;

moving said holder by use of said grasping means to a location at which said second securing means can secure said holder, said grasping means being rotated through a predetermined angle while said holder is coupled to said grasping means; and locking said holder to said head by use of said second securing means.

21. The method according to claim 20, wherein said grasping means includes hooks, and said holder includes grooves corresponding to said hooks and at least two coupling elements each corresponding to one complementary element on said head; and wherein said method comprises:

positioning said machining head and secured holder facing said grasping means;

moving said two coupling elements horizontally relative to one another so as to engage said hooks in said grooves;

separating said holder from said machining head;

moving said machining head vertically away from said coupled grasping means and holder;

rotating said coupled grasping means and holder;

by relative vertical movement, bringing said machining head to face said coupled grasping means and holder, and engaging and locking either of said coupling elements of said holder in said one element on said machining head;

by relative horizontal movement of said engaged machining head and holder and said grasping means, releasing said hooks from said grooves;

positioning said engaged machining head and tool facing a wire electrode on an EDM machine to which said machining head is connected; and cutting said tool by employing said wire electrode.

* * * * *